US007113070B2

(12) United States Patent
Deng et al.

(10) Patent No.: US 7,113,070 B2
(45) Date of Patent: Sep. 26, 2006

(54) DOOR LOCK AND OPERATION MECHANISM

(76) Inventors: Sheng Bill Deng, 3 Brook Rd., Unit 10, Salem, NH (US) 03079; Sheng Yung Deng, 84 Boylston St., Apt. 1, Malden, MA (US) 02148

( * ) Notice: Subject to any disclaimer, the term of this patent is extended or adjusted under 35 U.S.C. 154(b) by 276 days.

(21) Appl. No.: 10/395,628

(22) Filed: Mar. 21, 2003

(65) Prior Publication Data

US 2004/0183652 A1 Sep. 23, 2004

(51) Int. Cl.
*G05B 19/00* (2006.01)
*G06F 7/00* (2006.01)
*G06K 19/00* (2006.01)
*H04B 1/00* (2006.01)
*H04L 9/14* (2006.01)

(52) U.S. Cl. ........................ 340/5.2; 340/5.7; 340/5.82; 340/5.83

(58) Field of Classification Search ................. 340/5.2, 340/5.3, 5.5, 5.6, 5.7, 5.8; 70/278.1, 278.4, 70/213, 432, 107, 277
See application file for complete search history.

(56) References Cited

U.S. PATENT DOCUMENTS

| | | | | |
|---|---|---|---|---|
| 4,972,694 | A | 11/1990 | Aulbers et al. | 70/277 |
| 5,083,122 | A | 1/1992 | Clark | 70/278 |
| 5,138,468 | A | 8/1992 | Barbanell | 359/2 |
| 5,339,662 | A * | 8/1994 | Goldman | 70/277 |
| 5,552,766 | A | 9/1996 | Lee et al. | 340/541 |
| 5,628,216 | A * | 5/1997 | Qureshi et al. | 70/278.7 |
| 5,718,513 | A | 2/1998 | Booth et al. | 374/162 |
| 5,745,046 | A * | 4/1998 | Itsumi et al. | 340/5.83 |
| 5,775,142 | A * | 7/1998 | Kim | 70/277 |
| 5,841,347 | A * | 11/1998 | Kim | 340/542 |
| 5,923,264 | A * | 7/1999 | Lavelle et al. | 340/5.64 |
| 5,996,357 | A | 12/1999 | Park | 62/125 |
| 6,035,676 | A * | 3/2000 | Hudspeth | 70/278.1 |
| 6,078,265 | A | 6/2000 | Bonder et al. | 340/825.31 |
| 6,107,934 | A * | 8/2000 | Andreou et al. | 340/5.71 |
| 6,115,484 | A * | 9/2000 | Bowker et al. | 382/127 |
| 6,259,352 | B1 * | 7/2001 | Yulkowski et al. | 340/5.7 |
| 6,373,967 | B1 | 4/2002 | Pu et al. | 382/115 |
| 6,374,652 | B1 | 4/2002 | Hwang | 70/277 |
| 6,378,344 | B1 | 4/2002 | Gartner | 70/278.1 |
| 6,381,999 | B1 * | 5/2002 | Doong | 70/107 |
| 6,830,217 | B1 * | 12/2004 | Movsesian et al. | 244/129.5 |
| 6,927,581 | B1 | 8/2005 | Gozzini | |
| 2004/0164845 | A1 * | 8/2004 | Hwang | 340/5.53 |

* cited by examiner

*Primary Examiner*—Brian Zimmerman
*Assistant Examiner*—Nam Nguyen
(74) *Attorney, Agent, or Firm*—Davis & Bujold, P.L.L.C.

(57) ABSTRACT

A locking doorknob recognizes a fingerprint, in which the detecting sensor of a fingerprint is installed on the spot of the doorknob that a thumb or other fingers are placed naturally as the door is being opened. The locking doorknob is an electro-mechanical device which can be powered by a remote electrical power system, specifically by electromagnetic induction through the door latch and strike plate. During operation, as soon as a user grasps the doorknob, a fingerprint is measured and searched, and if the fingerprint corresponds to a fingerprint previously input, the door is unlocked and the doorknob can be turned to open the door. In this way, fingerprint recognition and opening of the door are performed at the same time.

4 Claims, 12 Drawing Sheets

DOOR LOCK AND OPERATION MECHANISM

FIELD OF THE INVENTION

The present invention relates to a biometric locking doorknob or door lever which recognizes a fingerprint and which is installed for example on the door in a house, an apartment or an office. More particularly, the power dependent fingerprint detecting sensor in the doorknob or lever is supplied with the necessary electrical power for operation via a rechargeable battery which is charged via a remote recharging source circuit. According to the present invention, when an authorized person grasps the doorknob or lever, a command is issued to activate or deactivate the locking doorknob or lever accordingly when the persons fingerprint, as received by the fingerprint detecting sensor corresponds to a fingerprint previously input.

BACKGROUND OF THE INVENTION

Previously, a locking doorknob exists that includes a sensor plate which recognizes a fingerprint input as belonging to a certain user. In such a system, the sensor plate has been installed in a place other than on the doorknob. In that case, when a person touches the sensor plate to measure his fingerprint, the door becomes unlocked if the fingerprint read by the detecting sensor corresponds to a fingerprint previously input.

That prior locking doorknob which recognizes the fingerprint has been applied to various kinds of doors using the above-mentioned function, however, when the prior locking doorknob has been used for an automobile door, the price is substantially high. Furthermore, as mentioned above, the prior invention has been installed separately from a door and a controller so it is not conducive to be installed in a general place such as a house or an office.

In the case of manual doors, there is difficulty in opening the door because the detecting sensor is located separately from the doorknob. Therefore, a person still has to turn the approved through the detecting sensor of a fingerprint. This requires a two-step procedure to actually open the door, which can be cumbersome for the user.

The prior art locking doorknobs include a fingerprint sensor on the door handle or lever, however, the door lock and detecting sensor are powered by a conventional battery which must be replaced from time to time, or by an AC adapter. The known systems are powered by some sort of battery located either in the door or the handle itself in which would necessarily need to be replaced upon depletion which is inefficient, often requires tools and a skilled locksmith, and can lead to failure of the door locking device at inopportune times.

The prior locking doorknob which recognizes a fingerprint has been applied to various kinds of doors using the above mentioned function, however, the prior locking doorknob which have been used are prohibitively expensive and, furthermore, the known handles have been located separately from a door and a controller so it is not conducive to be installed in a general place such as a house or an office.

Also In the known systems, the detecting sensor of a fingerprint is located separately from the doorknob, so that a person has to turn the doorknob in order to open the door after the identification is approved through the detecting sensor of a fingerprint.

SUMMARY OF THE INVENTION

Thus, in order to solve the above mentioned problems, the detecting sensor of a fingerprint of the present invention is installed on the spot of the doorknob that a thumb is placed naturally. So when a user holds the doorknob, his fingerprint is measured and searched, and if the fingerprint corresponds to a fingerprint previously input, the door is unlocked and the doorknob is turned to open the door. Therefore, fingerprint recognition and opening of the door are performed at the same time.

Another object of the present invention relates to a locking doorknob which recognizes a fingerprint and that is installed on the door in a house, an apartment, or an office. According to the present invention, when a person holds the doorknob, the detecting sensor of a fingerprint, corresponds to a fingerprint previously input.

A further object of the present invention is to provide a biometric fingerprint sensor on a doorknob and system to verify the applied fingerprint to lock or unlock a door.

Yet another object of the present invention is to provide a remote time dependent power source and circuit which supplies electrical power to either recharge a rechargeable battery in the doorknob or to provide power to the verification system and locking and unlocking mechanism.

A still further object of the present invention is to use the principle of electromagnetic induction to create an electrical current in an inductive winding in the door latch through an inductive coupling in the strike plate in order to recharge the battery and power the verification system and locking and unlocking mechanism.

Still a further object of the present invention is to provide an environmental sensor either alone, or in combination with the fingerprint sensor device which would allow the user of a door on one side or the other to recognize at least one of a specified temperature, smoke, fire, gas or other air quality variation or condition on the opposing on the opposite door side.

The present invention also relates to a door locking apparatus comprising a door opening device supported on a door, the door opening device having a user verification system for receiving input data comprising; a memory for storing comparison data; a processor for comparing received input data with the stored comparison data and producing an output instruction; a locking mechanism controlled according to the output instruction from the processor; a door latch controlled by the locking mechanism, the door latch having a locked position and an unlocked position; and a remote power source separate from the door opening device for providing electrical power to the operate the locking mechanism and user verification system.

The present invention also relates to a door locking apparatus comprising a door opening device supported in a door, the door opening device having a user verification system for receiving fingerprint input data comprising; a memory for storing fingerprint comparison data; a processor for comparing received input data with the stored comparison data and producing an output instruction; a locking mechanism controlled according to the output instruction from the processor; a door latch controlled by the locking mechanism, the door latch 70 having a locked position and an unlocked position; and a remote power source separate from the door opening device for providing electrical power to the operate the locking mechanism and user verification system; and a second power source integral with the door opening device and directly connected to the locking mechanism and user verification system.

The present invention further relates to a method of operating a door locking apparatus comprising the steps of providing an electrically operated door opening device supported in a door; storing user comparison data in an electronic memory of a user verification system in the door opening device; inputting user data to the user verification system in the door opening device; comparing user input data with the stored user comparison data in a processor; producing an output instruction from the processor to control a locking mechanism connected to a door latch having a locked position and an unlocked position; and supplying electrical power to operate the locking mechanism and user verification system from a remote power source separate from the door opening device.

BRIEF DESCRIPTION OF THE DRAWINGS

The invention will now be described, by way of example, with reference to the accompanying drawings in which.

DETAILED DESCRIPTION OF THE INVENTION

Figure 1:
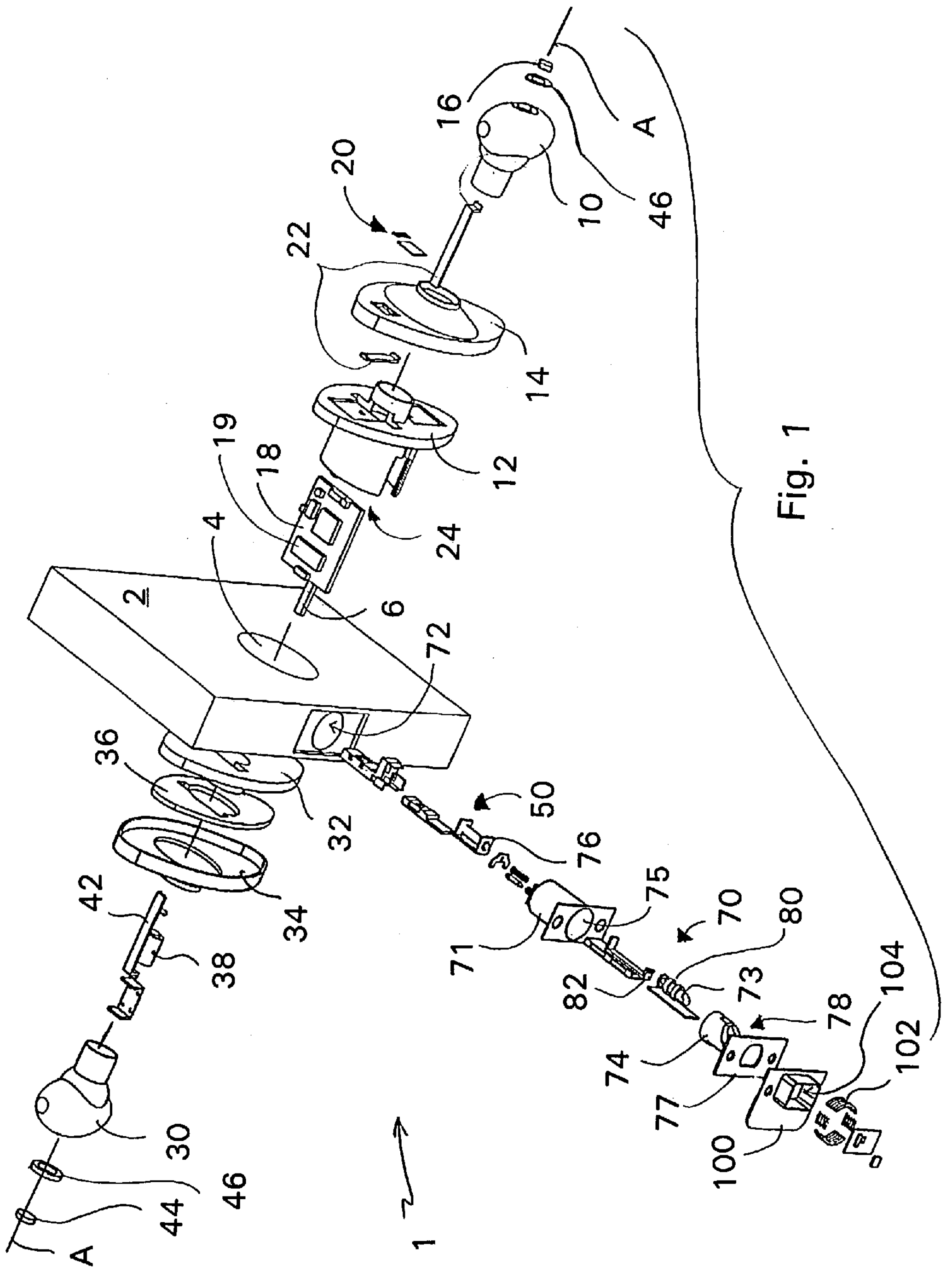
FIG. 1 is an exploded perspective view of the door locking mechanism according to an embodiment of the present invention.

In general, and observing FIG. 1, the locking doorknob 1 or lever and operation system and mechanisms of the present invention will now be described. As an initial matter, the locking doorknob 1 consists of a first knob 10 or lever on one side of a door 2, and a second knob 30 or lever on a second opposing side of the door 2 as is typical and conventionally known for opening and closing a door. The first doorknob 10 or handle is connected with and supported in a doorknob hole 4 in the door 2 by a first doorknob body portion 12 and the second doorknob 30 or handle is also connected with and supported in the doorknob hole 4 in the door 2 by a respective second doorknob body portion 32. A respective first and second cover plates 14, 34 are interspaced between the respective handles and the body portions, and as is well known in the art, covers the exposed body portions on either side of the doorknob hole 4 mainly for purposes of aesthetics.

A knob operations shaft 6 which defines an axis of rotation of the first and second doorknobs 10, 30 or handles substantially through the center of the door knob hole 4 is connected between the first and second doorknobs 10, 30 or handles. The operations shaft 6 extends through a central passage in the first doorknob body support, through the doorknob hole 4, and through the second doorknob body support to engage the second doorknob 30 or handle on the opposing side of the door 2. The operations shaft 6 transmits the turning action of either of the doorknobs at least to a lock mechanism 50, which in turn, if unlocked according to a positive indication from the fingerprint scanning plate 16 and related processor 18 as will be discussed in further detail below, provides for retraction of the door latch 70 and opening of the door 2.

As is also known in the art, the first and second doorknobs 10, 30 or levers are generally attached via their respective body portions by screws or a bolt mechanism which allow a certain axial variance between the first and second body portions and knobs 10, 30 along the axis of rotation A. The first and second doorknobs 10, 30 themselves are provided with axially variable keys to provide variable axial engagement of the ends of the operations shaft 6 in order to accommodate different widths, i.e., thicknesses, of doors. As these features are well known in the art, no further discussion is provided herein.

A door latch hole 72 is provided along a free edge of the door 2, as opposed to the hinged edge of the door 2, and formed axially perpendicular to the axis of rotation A and communicating with the doorknob hole 4. Inside the door latch hole 72 is situated a door latch bolt 74 having, at one end, a connection mechanism 76 for connecting with the lock mechanism 50 connected to the operations shaft 6, and an opposing free end engages and disengages with a strike plate 100 in the door frame in accordance with a biasing spring in the door latch bolt 74 and the locking and unlocking of the lock mechanism 50.

When the lock mechanism 50 is unlocked, the rotation of a doorknob 1 or handle, and the relative rotation of the operation shaft 6 causes the door latch bolt 74 to withdraw from an outwardly biased position, usually engaging the strike plate 100 when the door 2 is closed, and retract substantially within the door latch hole 72. This enables the door 2 to swing freely on its hinged edge and open.

As discussed above and as is well known in the art, the door latch bolt 74 may be springably biased outwardly relative to the free edge of the door 2 so that upon the user releasing the rotation of the doorknob 1 or handle the door latch bolt 74 is springably returned to the outwardly biased position. Upon the door 2 being closed, the door latch bolt 74 self-engages with the strike plate 100 due to the inertia of the closing door 2 and a sloped surface on the free end of the latch bolt 74 to facilitate re-engagement with the strike plate 100.

The latch bolt 74 may also be of the dead bolt type where no springable bias is provided and mere rotation of the handle in either direction is necessary to engage and disengage the latch bolt 74. In either event in the present invention, the strike plate 100 and the door latch bolt 74 are provided with an inductive coupling for causing an induced current to be generated in an inductive winding provided in the latch bolt 74. The inductive winding in the latch bolt 74 is connected to a charging circuit with connects with a rechargeable battery 38 generally positioned in either of the door handles. The induced current, as described above, is generated according to the principles of electromagnetic induction by an electrical source current i in a second inductive winding 80 located in conjunction with the strike plate 100. A further description of these features is provided below.

Figure 2:
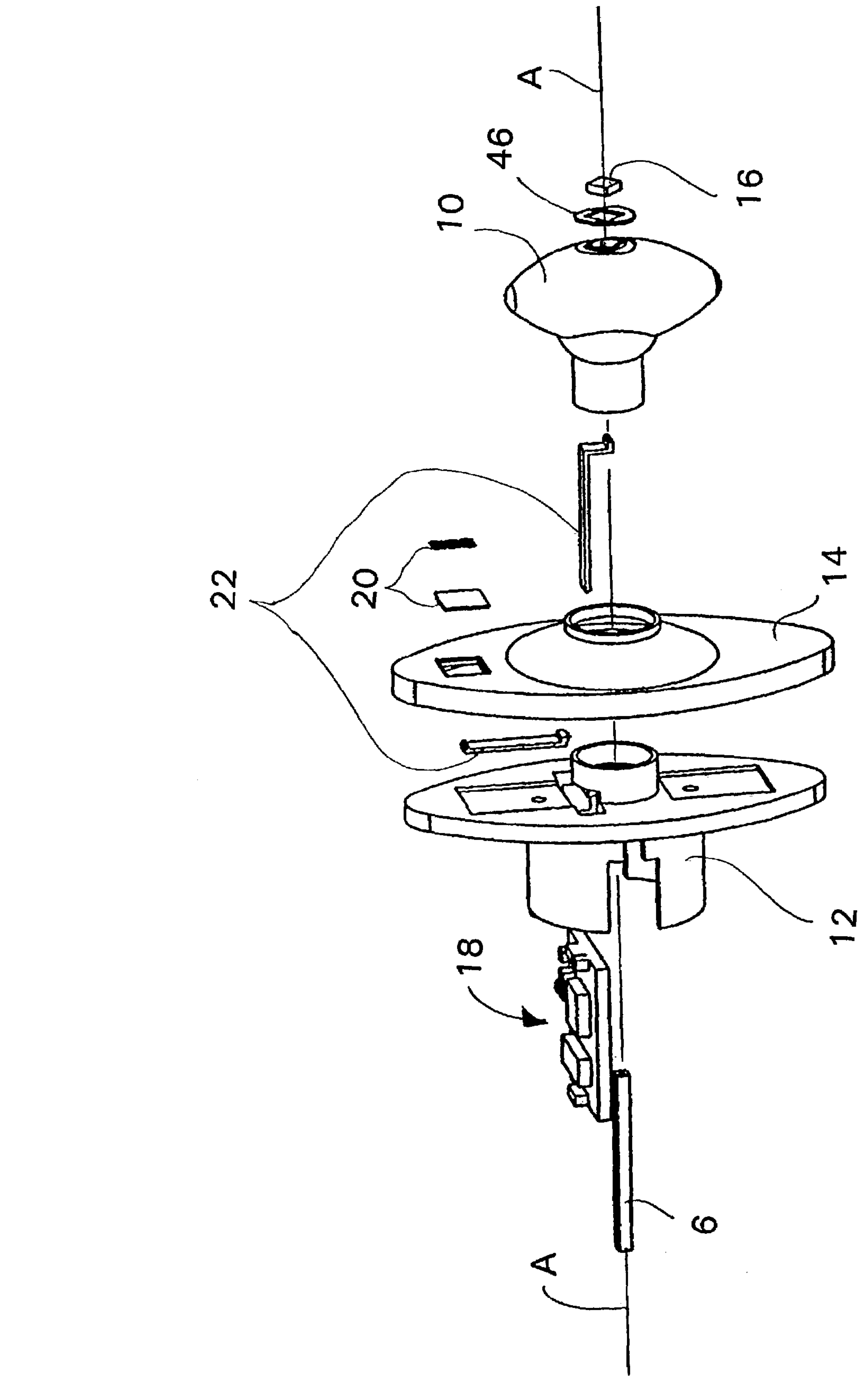
FIG. 2 is an exploded perspective view of a first doorknob of the present invention.

Turning now to FIG. 2, a further description of the biometric operation of the present invention is provided. In at least one of the first or second doorknobs 10, 30 or handles, shown here in conjunction with the first doorknob 10, the fingerprint scanning plate 16 may be generally located on the extreme end in a position coincident with the axis of rotation A of the doorknob handle. This is the position where a person's thumb would generally or easily be placed during operation of the doorknob 10, 30 or handle. The fingerprint scanning plate 16 is of a non-optical type which is generally commercially available, for instance the TouchChip® as provided by STMicroelectronics®. The scanning plate 16 is connected via an electrical connection 22 which extends within the first doorknob 10 from the scanning plate 16 to a processor module 18 located substantially between the first and second doorknob body support members 12, 32 and within the doorknob hole 4.

The fingerprint scanning plate 16 is thus capable of reading a fingerprint as input and sending the fingerprint as acquired data to the processor module 18 whereupon it can be compared with saved fingerprint data previously input, so as to verify or authorize a respective unlocking or locking of the door locking mechanism 1.

In order to provide the known fingerprint data to the fingerprint processor module 18, a control pad 20 is provided with the first cover plate 14. An opening is formed in the cover plate 14 so that a user can input, via the control pad 20, the necessary commands to operate the control pad 20 in the body support flange. The control pad 20 may be of the LCD type or a dial pad as are well known and can be provided with keys or buttons as a direct input device for inputting the data in cooperation and the desired fingerprints for authorized users, as well as for deleting or otherwise changing desired fingerprints and related data in the processor 18. An electrical connection 22 extends between the control pad 20 and the processor 18, and a decoder device 19 can be situated between the control pad 20 and the processor 18 having a memory to functionality to unlock the locking mechanism 1 where a positive identification occurs.

Figure 3:
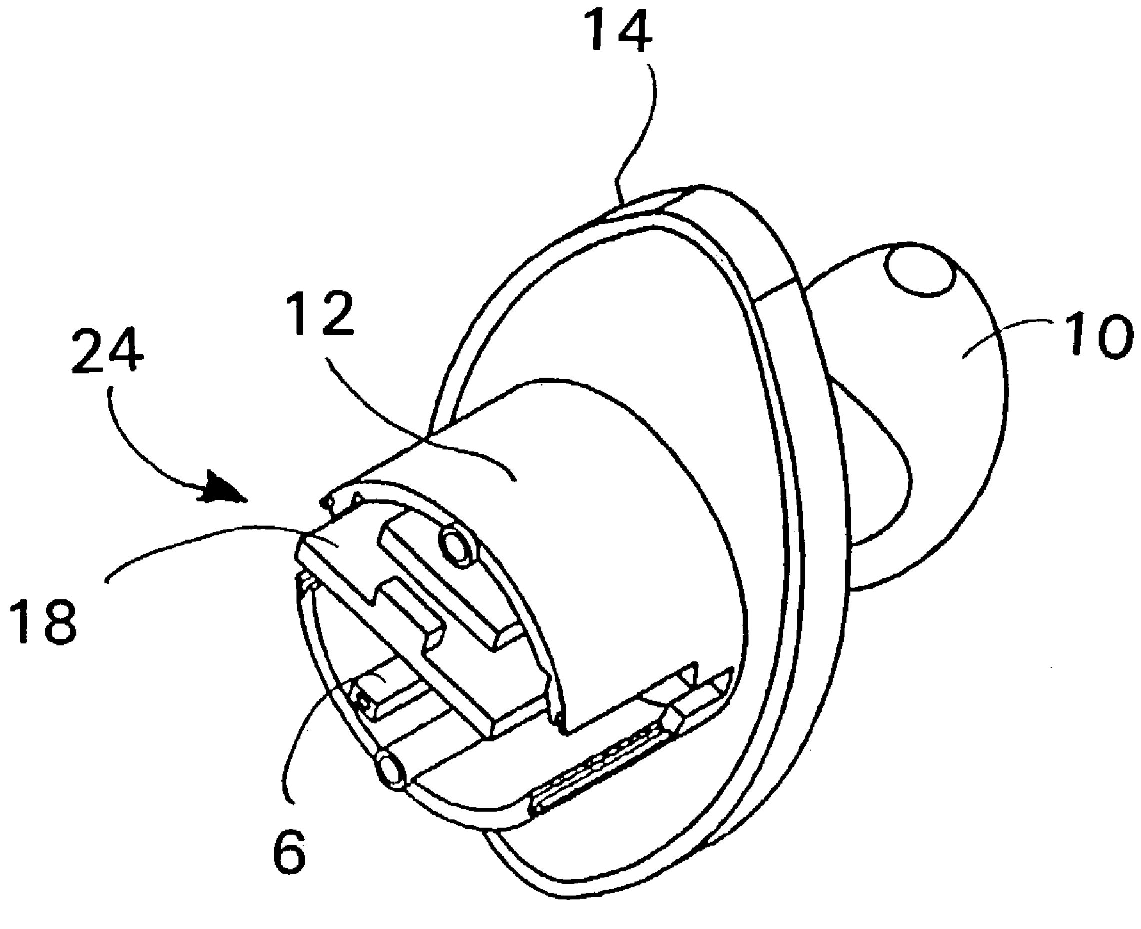
FIG. 3 is a perspective view of the first doorknob in accordance with the present invention.

Observing FIG. 3, the processor is held at least partially by a mating slot 24 in the first body portion 12 which is located as centrally as possible with respect to the door hole 4 to provide as much room as possible for the processor 18 without interfering with the mechanical workings of the operations shaft 6 and lock mechanism 50 and the doorknob securing bolts and engagement bores.

A code, when provided to the control pad 20, would enable the user to input a fingerprint, or a number of fingerprints, as data to be stored in the fingerprint processor module 18. If the fingerprint scanning plate 16, in a normal operation mode, sensed a stored fingerprint, then those persons authorized, via stored fingerprints, would be able to lock or unlock the door locking operation mechanism 50. In addition, a code could also be provide to override the fingerprint matching function of the processor 18, for example, in the case of the fingerprint scanning plate 16 failing or unable to read an applied fingerprint. A further discussion of the processor function is provided below.

Figure 4:
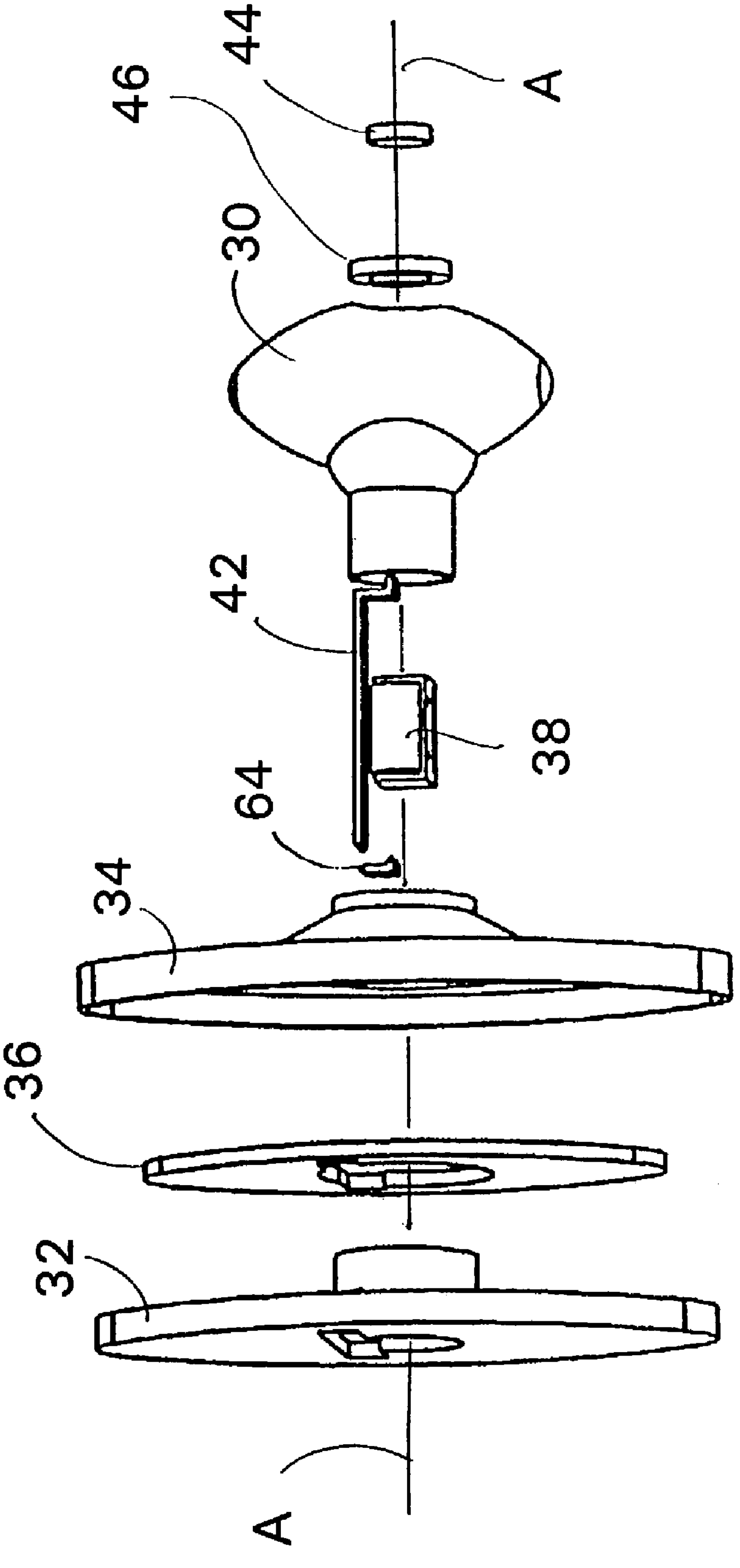
FIG. 4 is an exploded perspective view of a second doorknob in accordance with the present invention.
Figure 5:
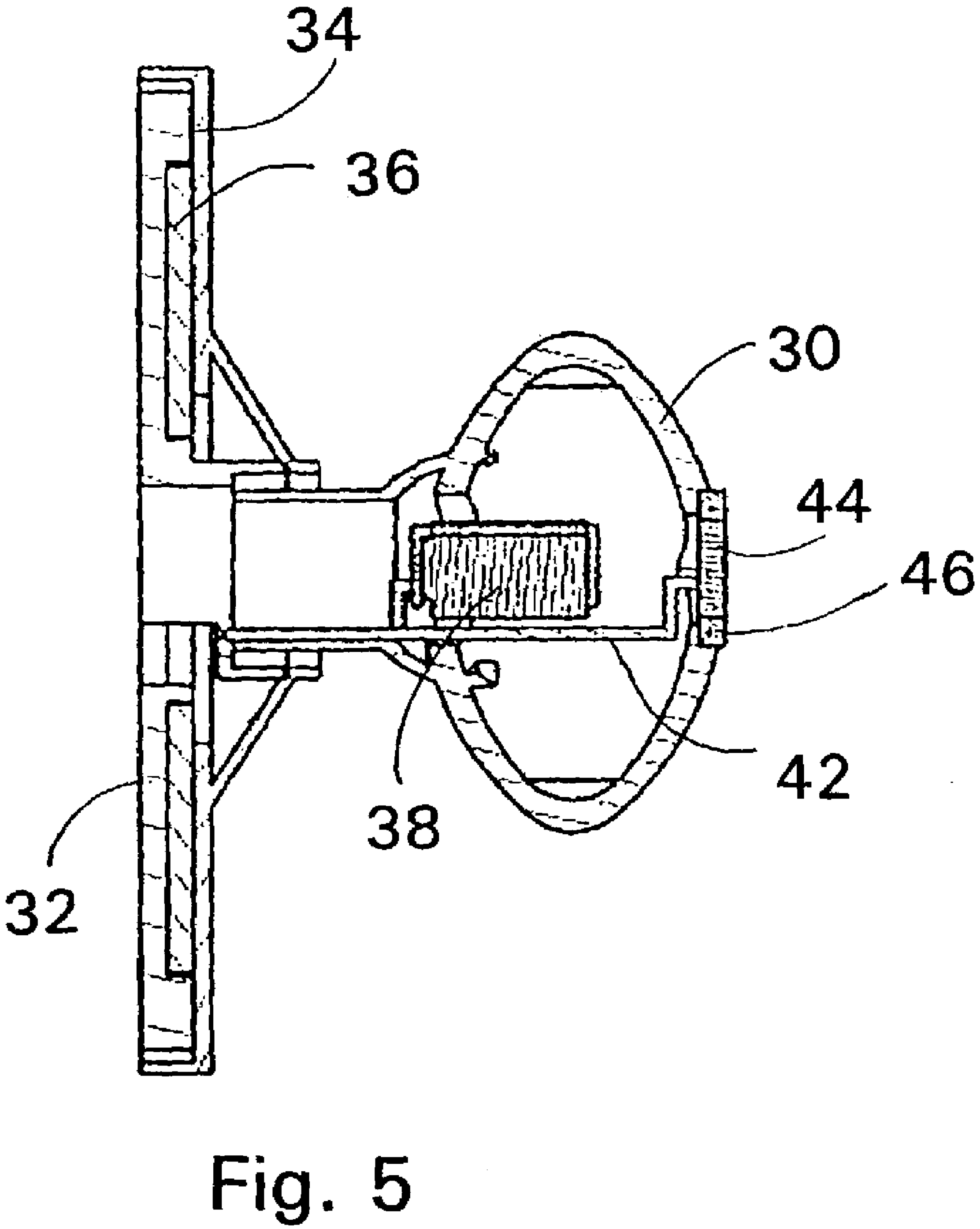
FIG. 5 is a cross-sectional view of the second doorknob of the present invention.

FIGS. 4 and 5 show the second doorknob 30 provided with an environmental sensor plate 36 which can be one of a variety of temperature sensing devices including a thermochromic sensor which changes color depending upon a level of temperature to which the sensor 36 is exposed. More preferably the sensor 36 is provided with a thermocouple which relays an electrical signal via a second electrical connection 42 to the processor 18 and then to the display of the control pad 20 to inform a user of the temperature by either visual or audible means. The sensor plate 36 is supported between the second cover plate 34 and the second body portion 32 and may be provided with any number of different environmental sensors, for example; temperature, smoke, fire, gas or other air quality variation or condition on the opposing on the opposite door side.

Also in the second doorknob 30 is provided a battery 38 for powering the sensor plate 36 and processor 18. The battery 38 is situated substantially centrally within the doorknob 30 and because it is a rechargeable battery 38 is connected to the charging circuit from the induction coil in the latch, a further description of which is provided below. The battery 38 sends power to the processor 18 and biometric fingerprint scanning plate 16 and the electromechanical locking mechanism 50 via the second electrical connection 42.

It is well known in the art that a fingerprint processor module 18 and biometric fingerprint, as discussed above, must be provided with some sort of power source in order to generate the data and control functions as described above. As previously discussed, the present invention utilizes a battery 38, namely a rechargeable battery, positioned in one of the first or the second doorknob 10, 30 or handle as one source of electrical power to operate the processor module 18 and fingerprint scanning plate 16. A positive and negative leads 64 are provided from the rechargeable battery holder to the processor module 18 to provide the required electrical power.

The second doorknob 30 is also provided with an on/off button 44 for essentially manually, enabling and disabling the entire system from the second side of the door 2. The on/off button 44 is situated in a supporting ring 46 in the center end of the second doorknob 30, as is typical in the art, and communicates with the locking mechanism 50, via the second electrical connection, to enable or disable the locking mechanism 50. The on/off button 44 is usually situated on the inner side of a door 2 to facilitate the user disabling the locking mechanism 50 once they have entered the room and intend to stay there for a period of time. It is also to be appreciated that the supporting ring 46 may be an indicator device, for example a luminous dial which is connected to the environmental sensor 36 and which lights or changes color in accordance with a desired environmental indication from the sensor 36. It is to be appreciated that a similar type indicator ring 46 may also be used with the first doorknob 10 to support the fingerprint scanning plate 16 and provide the same indication on the first side of the door 4.

Figure 6:
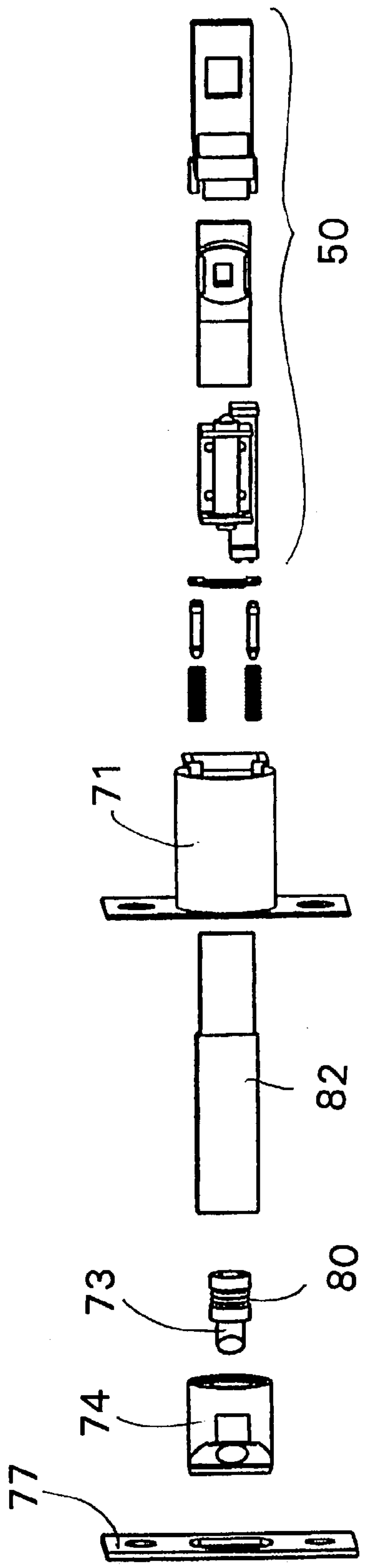
FIG. 6 is an exploded side view of the door latch and locking mechanism.
Figure 7:
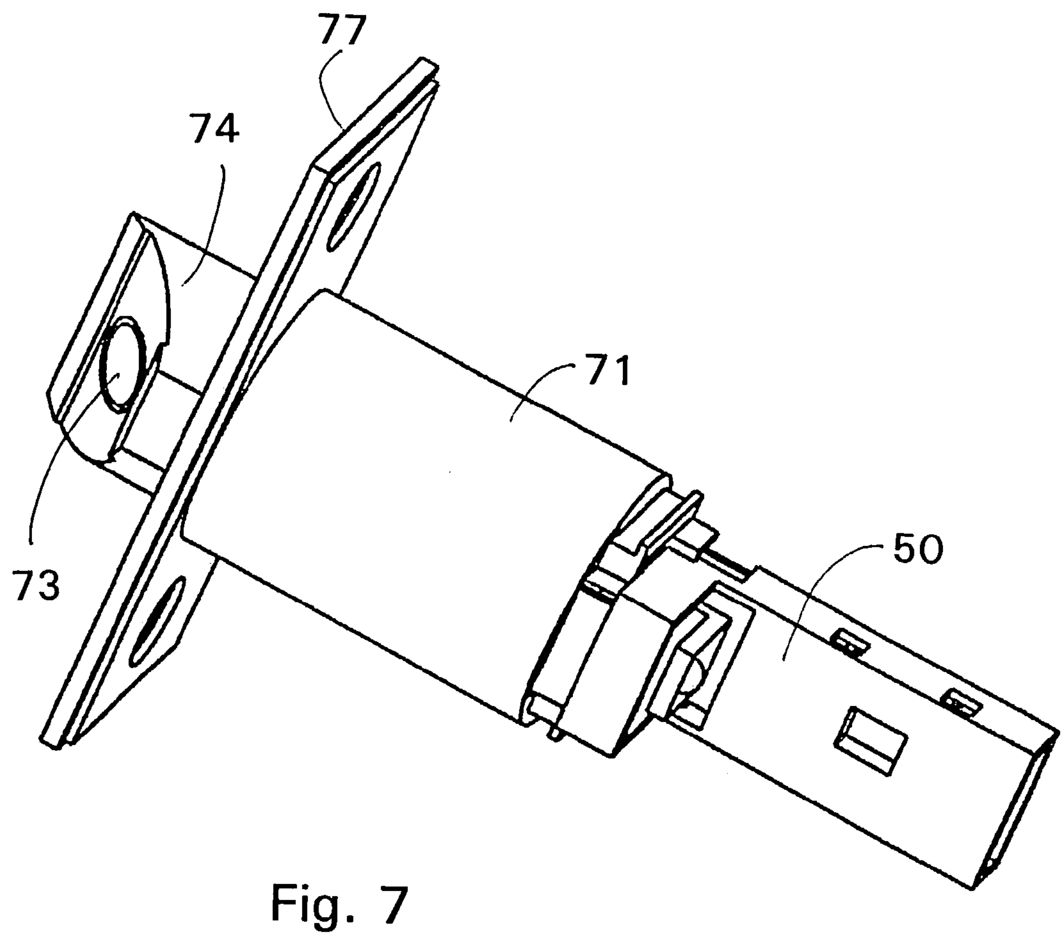
FIG. 7 is a perspective view of the assembled door latch and locking mechanism.

FIGS. 6 and 7 show the lock mechanism 50 and the latch. The lock mechanism 50 is a conventional electromechanical solenoid actuated mechanism which is connected with the processor. In a first position, the lock mechanism 50 interrupts the interaction between the operations shaft 6 and the latch so that a turning of the doorknob fails to retract the door latch 70. When a certain signal is sent to the lock mechanism 50 that a positive fingerprint identification has been made by the processor 18, the lock mechanism 50 is actuated into a second position to allow the rotation of the doorknob and operations shaft 6, which acts on the latch operations member connected thereto, to retract the door latch bolt 74 and the central lock pin 73 incorporated therein from the strike plate 100 and within the door latch hole 72.

The central lock pin 73 is inserted and supported within a bore of the latch bolt 74. A portion of the lock pin 73 can be flush with or extend slightly from the end of the bore along the sloped end surface of the latch. The lock pin 73 is provided also with an induction coil which, due to a magnetic field M created by the source coil 102 in the strike plate 100, to be further discussed below, has an electrical current induced $i_2$ therein. In an embodiment of the present invention the central lock pin 73 can be made of a magnetic material to assist in focusing of the magnetic field flux M with respect to the induction coil 80. In an embodiment of the invention the coil 80 can be substantially wrapped around the magnetic material to facilitate such coupling. The induction coil 80 sends the induced current $i_2$ via electrical leads 64 to the charger circuit which, in turn, relays the appropriate electrical charge through the second electrical connection to the rechargeable battery 38 as well as directly to the processor 18. In normal operations, the induction coil 80 provides the processor 18 and lock mechanism 50 with operating power. In a power failure mode, the battery 38 can provide the necessary power to the system.

The entire door latch 70, lock pin 73 and charger circuit is generally supported and encased within a door latch housing 71 which holds all the discussed elements together and facilitates the mounting of the door latch 70 within the door latch hole 72. A latch guide plate 77 is usually placed over the end of the housing once the housing is mounted in a door hole for both functional and aesthetic purposes to provide further support to the door latch 70 as well as facilitate engagement of the door latch 70 with the strike plate 100.

Figure 8:
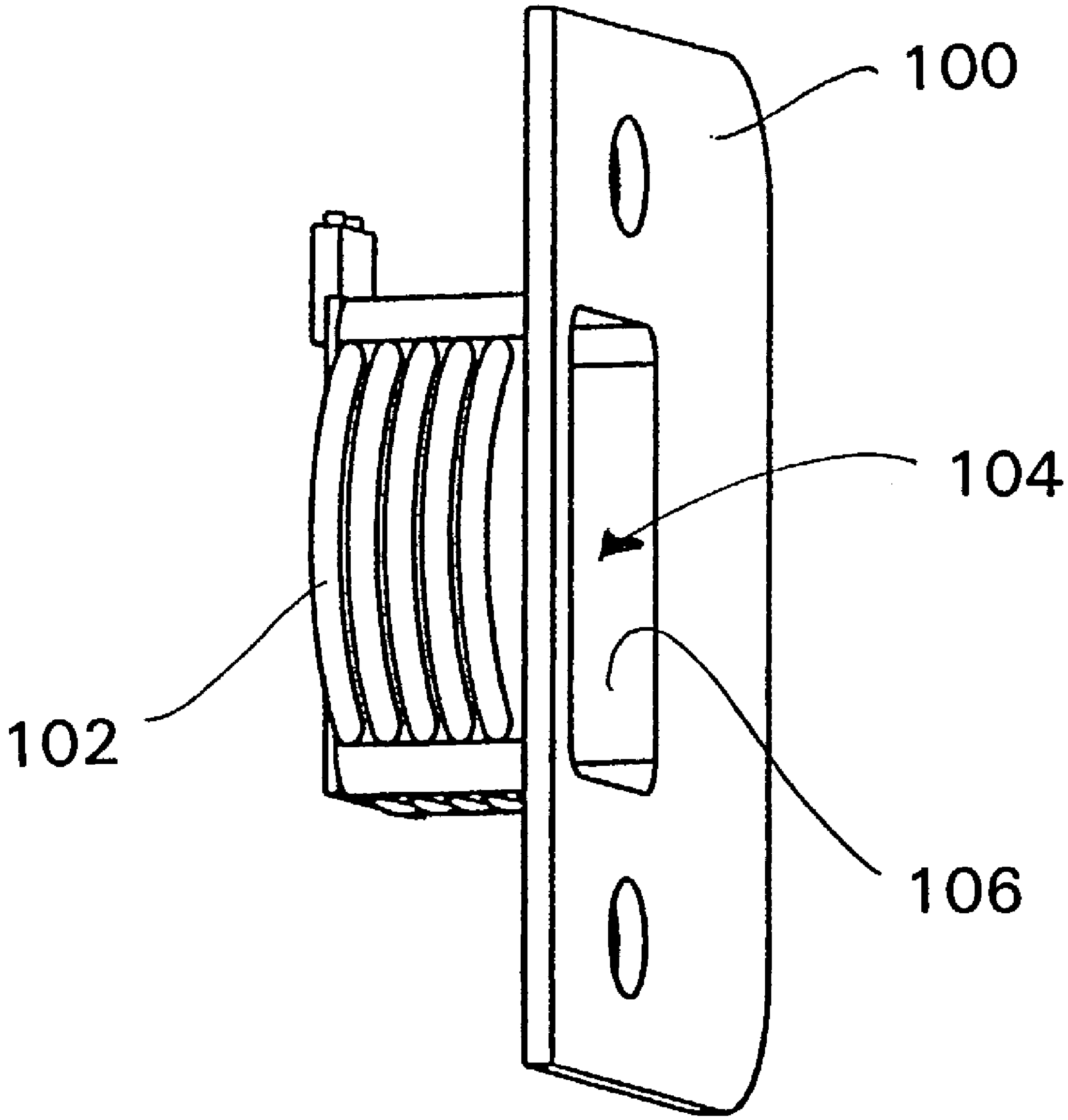
FIG. 8 is a perspective view of the strike plate and source coil.

FIG. 8 shows the source coil 102 in the strike plate 100. The strike plate 100 is, as well known in the art, incorporated in the door frame of a door 2, and in axial alignment with the door latch bolt 74 in the door 2. The strike plate 100 is provided with a depression or cavity for catching the door latch 70. The walls 106 of the strike plate 100 cavity are, in the present invention, provided with an induction source coil 102 incorporated therein. Because the source coil 102 is incorporated with the strike plate 100 in the door frame of the door 2, common electrical wiring may be easily connected to the source coil 102, via leads 64, energized by typical electrical service circuits either commercial or residential usually incorporated in the walls 106 of the building. As can be appreciated by those of skill in the art, when the door 2 is shut, the free end of the door latch 70 is captured in the cavity in the strike plate 100 and the induction coil 80 in the lock pin 73 is arranged substantially adjacent the source coil 102 in the strike plate 100.

Figure 9:
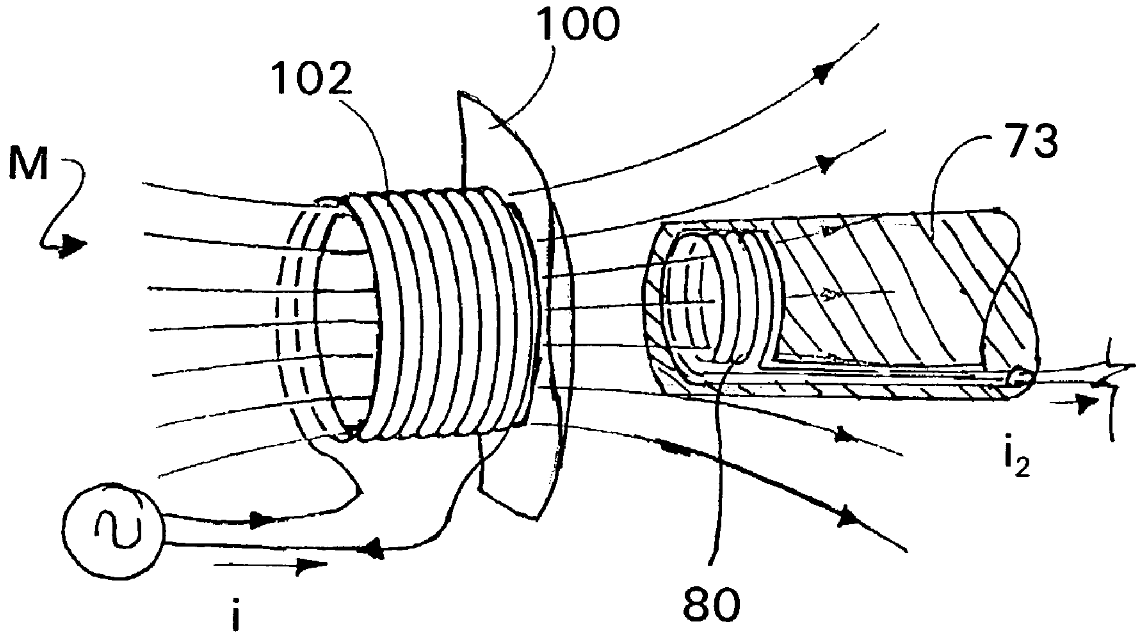
FIG. 9 is a diagrammatic representation of the use of electromagnetic induction in accordance with the present invention.

In order to recharge the battery 38, the present invention utilizes an inductive power transmission coupling as discussed above. By way of example, FIG. 9 shows a pair of inductive coils 80, the first situated in the door latch bolt 74 and the second located in the strike plate 100. Electrical induction $i_2$ involves the use of providing and generating an electrical source current i in one coil which is unattached but located substantially adjacent to a second inductive coil 80. The proximity of the electrical circuits where the second inductive coil 80 is the source coil 102 and is provided with power generates a magnetic field M which induces an electrical induced current $i_2$ in the first source coil 102. As seen in FIG. 9, the principle of inductance reveals that if a conductor supplied with a time dependent source current is near some other conductor, than the changing magnetic field M of the former can induce an electromagnetic force (EMF) in the later. Thus, if a time dependent source current in one conductor can induce an induced current $i_2$ in another nearby conductor. For instance, considering the present case where the second inductive coil 80 in the strike plate 100 carries a time dependent source current, it generates a magnetic field M wherein the flux lines of the magnetic field M, i.e., at least a portion of them, pass through the first coil 102 located in the door latch bolt 74 thus inducing the EMF in the first coil 102. Thus the time dependent EMF produces the induced current $i_2$ in the latch bolt coil 74 which is used to recharge the battery 38 via a pair of conducting wires extending from the first coil 102 in the latch bolt 74 to the battery 38 recharging unit in the second doorknob 30 or handle.

The magnetic field M strength produced by the source current in the strike plate coil 102 is proportional to the source current and is, therefore, dependent thereon and depends substantially on the sizes of the coils, their distance and the number of turns in each coil. Additionally, both the source and induction coils 80 should usually be aligned along the door latch axis at an angle commensurate with the angle of the sloped surface of the door latch bolt 74. Such an angle of the coils 80 is generally necessary to ensure the magnetic field M lines generated by the source coil 102 appropriately cross the induction coil 80 to generate the appropriate induction current therein. As such geometry and the physical elements of the mutual inductance and differently sized coils is well known in the art, it is readily apparent that when the strike plate 100 and the latch bolt 74 are engaged and the respective second and first coils 80, 102 are closely aligned, a desired induced current $i_2$ can be produced in the first coil 102 to recharge the battery 38, and thus power the processor 18 and locking mechanism 1.

In order to ensure that a desired induced current is induced in the induction coil 102 in the door latch 70, portions of the latch bolt 74, or the entire latch bolt 74, and even the central locking pin, may be made from a non-ferrous material to ensure that the magnetic field M lines are not interrupted between the source and induction coil $i_2$. The source coil 102 could also be placed on an outer portion of the door latch bolt 74, for example in grooves thereon, to better expose the induction coil 80 to the magnetic field M. The induction coils might also be placed separate from the latch bolt 74 and within the door 2 or the door latch hole 4 itself. For example, where the induction coils 80 are provide within the door latch hole 72 and around the outside of the door latch housing 71, the housing 71 and door latch 70 act as a core which could improve the electromagnetic induction efficiency of the present invention, and the door 2 itself, when made of a non-ferrous material would not interfere with the magnetic field lines of the source coil 102.

Referring now back to FIG. 4, the illustrated door handle 1 also comprises at least a first temperature sensor plate 36 sandwiched between the second body portion 32 and the second cover plate 34. By way of example, the sensor plate 36 be formed of a temperature sensitive material which changes color if its temperature exceeds a certain level. Such chemical temperature sensors are widely used and readily available and thus are not described in further detail here. With the particular embodiment illustrated, the senor plate 36 can be provided as any number of environmental senors 36 for air quality/condition, gas detection, heat, fire and smoke detection as well.

In use, the device functions by registering the desired environmental conditions and relaying them, via the second electrical connection, to an indicating device, i.e., visual, audible or otherwise, on the control pad 20 or in the processor 18 itself to alert a user. Thus, if the condition on one side of the door 2 exceeds a predetermined level, such level detected by the sensor 36 is displayed or audible on one or either side of the door 2 to indicate this situation. By way of example, the device allows one to observe a gross temperature change on an opposite side of the door 2. Heat is, therefore, not transferred through the thermal conductor independently from one room to the other.

The device is primarily used for fire detection. If one is standing in a room of normal temperature which would not in itself cause a color change in the device and if there were a fire in the adjacent room which caused the temperature in the adjacent room to exceed the predetermined temperature level for color change such as, for example 135° F., then the observer in the room temperature room would observe the color change and know that the adjacent room was extremely hot and possibly on fire. Such color change will occur in the device irrespective of the lower temperature in the room in which the observer of the color change is in. The device does not determine the relative temperature between the two rooms but is useful when there is an extreme difference in temperature which causes a color change to occur in the indicator located in the room that is not of higher temperature.

The system for verifying fingerprints and the associated functionality of the processor 18 and operation of the locking controller operation based thereon will now be described with reference to FIGS. 10 and 11. The control pad 20 can be an LCD touch pad or conventional button dial pad as is known in the art.

The control pad 20 is used to select different operation modes, some examples being: Enroll, Erase, Enter Passcode, Reset System, System Log, Set Time, Always Lock, etc. The control pad 20 can also be used as a backup system to unlock the system (door lock) in an event of failure in the fingerprint processing subsystem. Ideally, the control pad 20 can have an LCD or similar type display panel which turns Green/Red to indicate Unlocked/Locked when a user post the finger on the fingerprint sensor plate chip and the print is verified by the system. A yellow light should automatically turn-on if any of the buttons on the control pad 20 are pushed. Also a timer and temperature display on the control panel is an option to the system.

A battery life indicator may also be necessary. In a normal condition, the battery 38 should always be fully charged because the door 2 would generally tend to be mostly in the closed position. In view of the inductive power aspect of the present invention, which can directly power the processor and locking mechanism as well as charge the battery 38, the battery 38 can either be used to power the operation of the processor 18 and lock mechanism 50 or the battery 38 can be used as a backup in an event of power outage for a long period of time.

Figure 10:
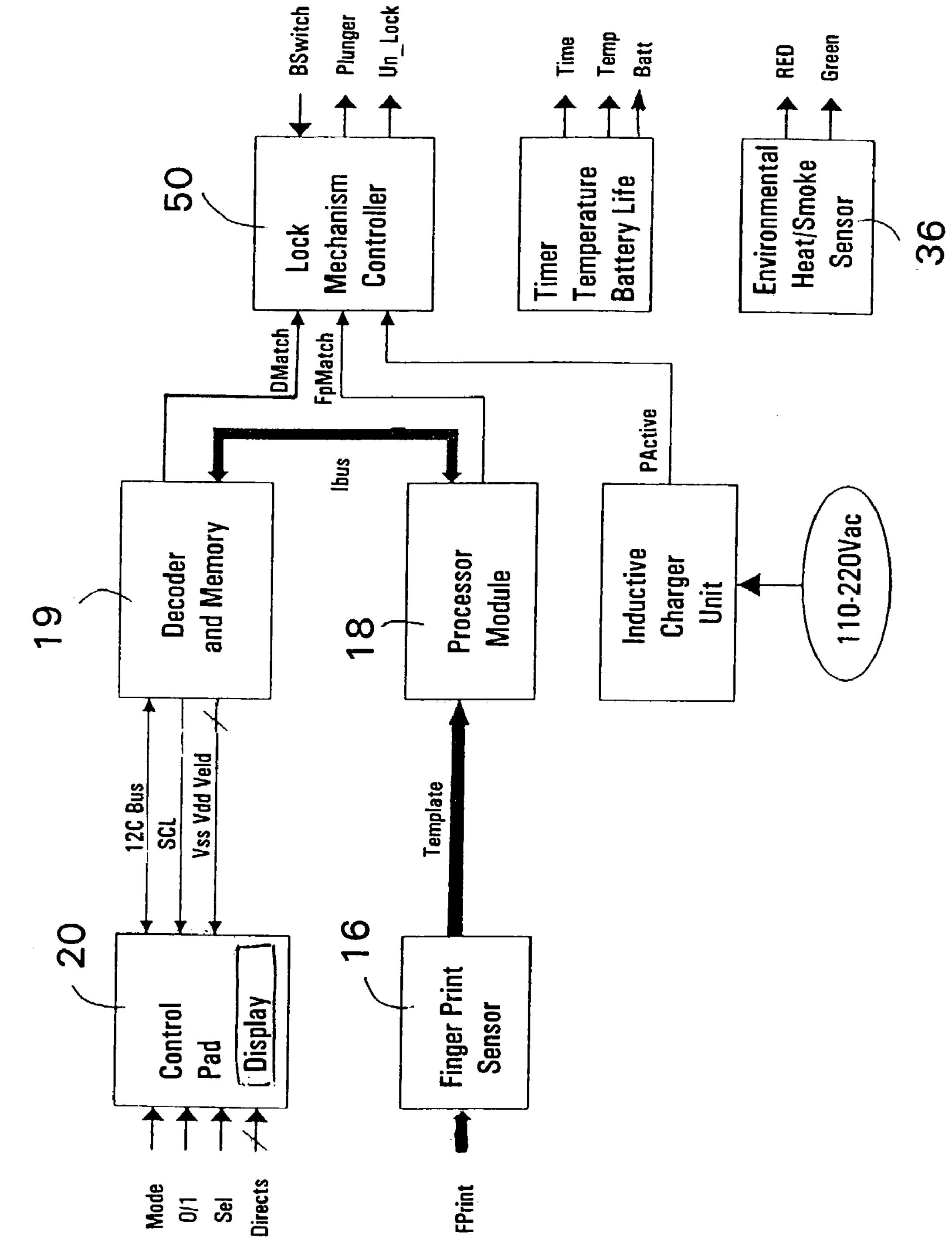
FIG. 10 is a diagrammatic representation of the system components and related functions.

The system shown in FIG. 10, includes the control pad 20, a decoder and memory 19, the fingerprint scanning plate 16, the processor module 18, the inductive charger unit and a lock mechanism 50 controller. The control pad 20 can be of any type known in the art. By way of example, the control pad 20 is provided with a number of input buttons or keys. Mode can be chosen by a mode button on the control pad 20 to select different menus of operations. The basic mode of operations are: Enroll, Erase, Enter Passcode, Reset System, System Log, Set Time, Always Lock, although other modes can be contemplated as well. An on/off button, 0/1 is also provided to turn-on the system. This button is optional since the fingerprint sensor plate chip may have an auto detection to turn-on the system once a finger tip is present to the sensor plate chip. A user touching any of the control pad 20 buttons would active (turn-on) the system. The system should automatically standby or even turn-off after "XX" number of seconds and retain its original state. A Confirm Select, Sel, is another one of the buttons available for the control pad 20 to confirm the selections on the LCD display. This button acts like an "Enter" button on the keyboard. Navigate keys may also be provided on the control pad 20 to help navigate through the control pad options. These buttons work along with the Sel button to select an object on the control pad display. The system should also have a factory default setting. The Super user (owner) should be able to reset the default setting through the control pad 20 once the system is installed.

Other inputs to the system, i.e., the processor, include; Fprint which inputs a user's fingerprint via the fingerprint scanning plate 16: Fprint is the human fingerprint applied to the sensor plate chip. A knob switch button, shown as a command BSwitch, is a switch button located on the second doorknob 30 to manually lock or unlock the system by providing a signal directly to the lock mechanism controller 50.

Outputs from the system, i.e., through the processor and locking mechanism controller 50 includes a dead lock plunger command to cause the latch to act as a locked deadbolt once the door 2 is closed and the system is locked. This can also be replaced by a mechanical plunger. Another output is an Un_lock output to Lock/Unlock the System: Un_lock is an output from the processor 18 and controller to the solenoid to electronically lock or unlock the lock mechanism 50. A time Output to the LCD control pad 20 to display current time. Temperature can also be an output to the LCD to display the current temperature on one side of the door 2 or the other.

Heat and Smoke Detection or other environmental conditions can be sensed and output to the control pad 20 to indicate a fire or smoke event on the other side of the door 2.

The control pad 20 is connected to the decoder, via a I2CBus or any other known electrical connector, which is the encoded LCD data signal, an SCL is the clock for the I2C data signal and Power and Ground for the LCD where VSS is ground, Vdd Power for the LCD logic and VLCD supply voltage for LCD (contrast adjustment). An Interface Bus Ibus is a bus of data that communicates between the Processor module 18 and the decoder.

The fingerprint scanning plate 16 works in conjunction with a fingerprint Template which is the soft copy of the user's template that the scanning plate 16 reads from the human fingerprint. A dial pad verify match, Dmatch, is an internal signal where passcode is matched with one of the user's passcode in memory. This signal can be replaced with FPMatch by Software.

FPMatch is an internal signal where Fingerprint and/or Dialpad passcode is matched. This signal drives the solenoid of the locking mechanism to unlock or lock the system. The inductive charger unit is provided with an internal signal PActive which turns the latch into a deadlock.

Figure 11:
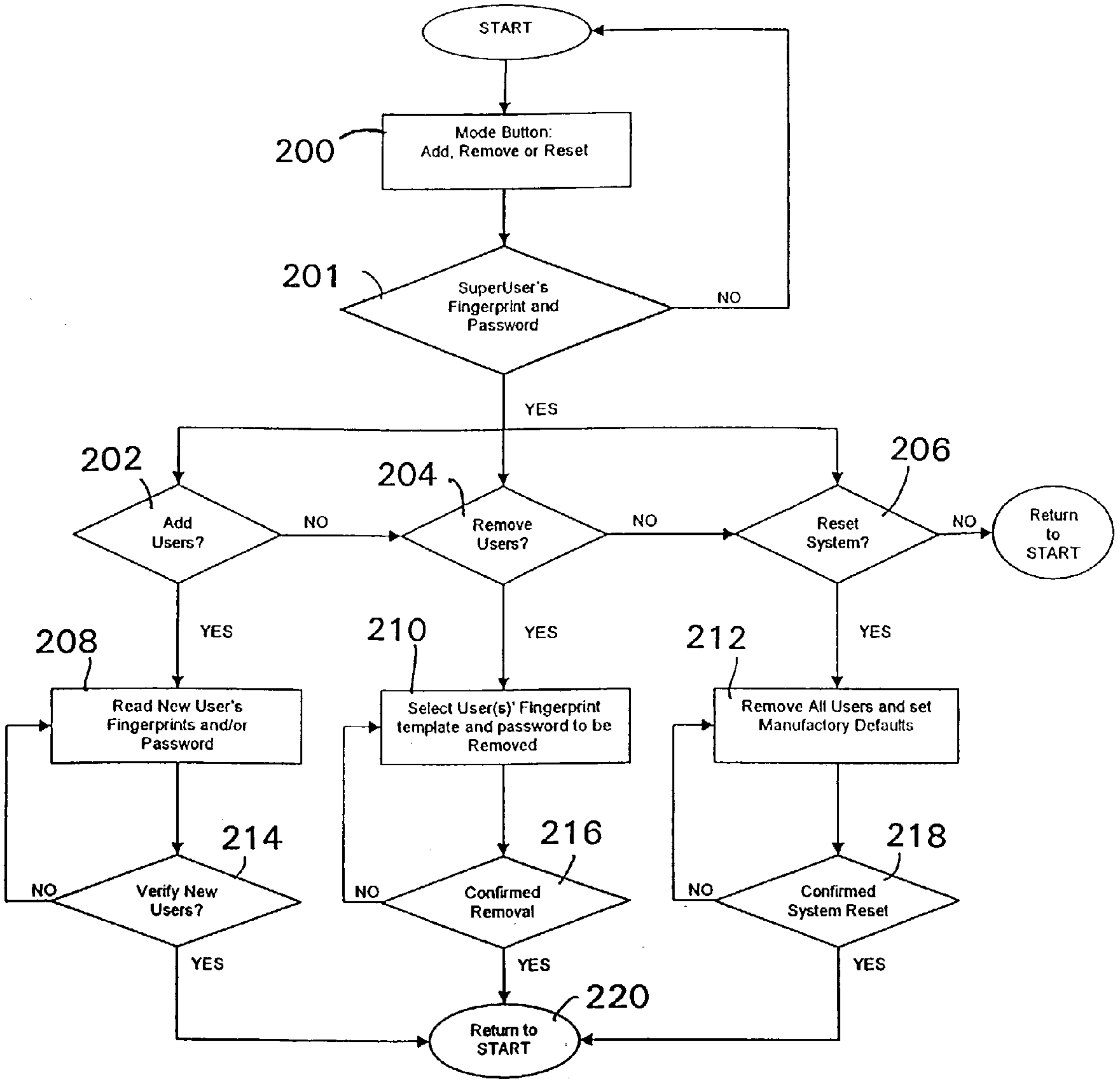
FIG. 11 is a flowchart for the input, removal or setting operations of a locking doorknob which recognizes a fingerprint in accordance with the present invention.
Figure 12:
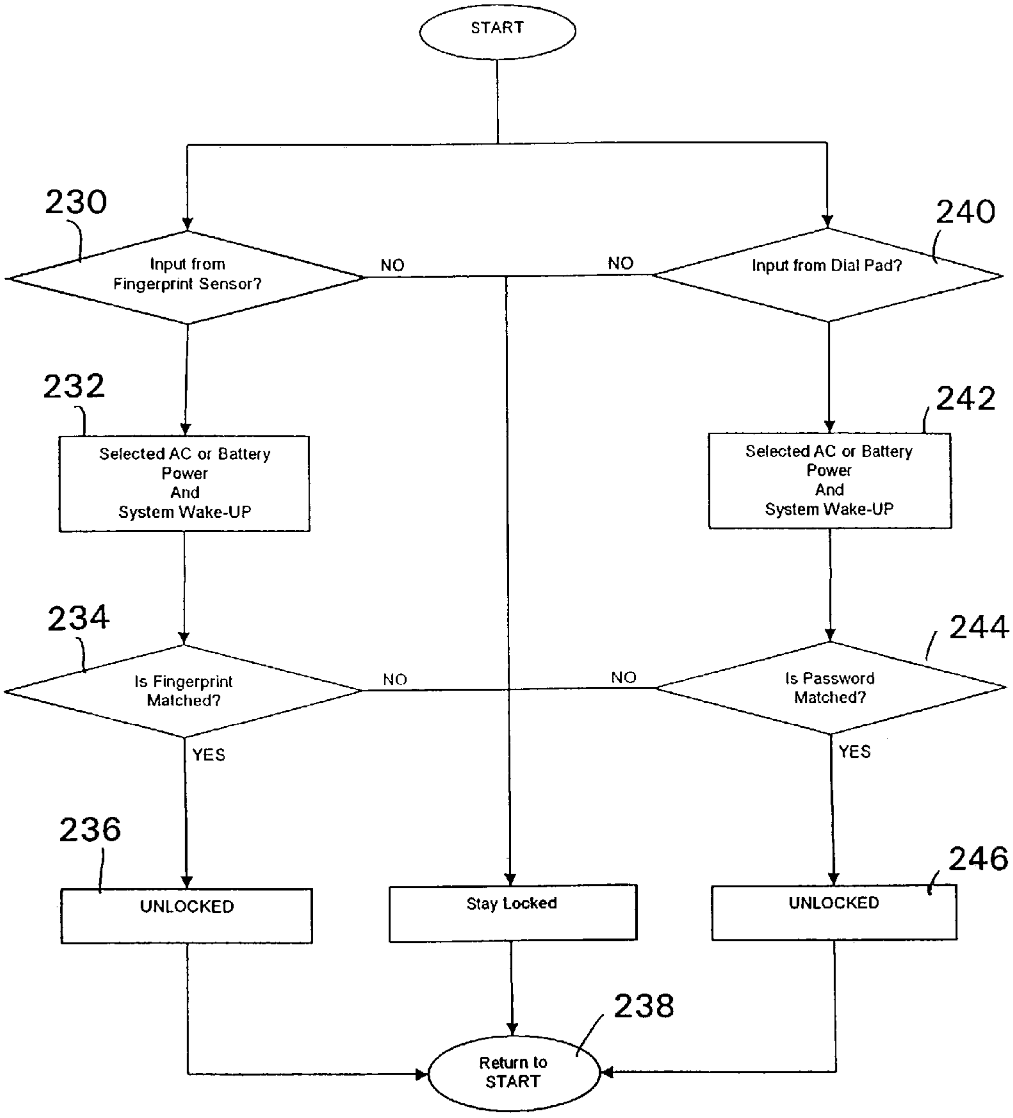
FIG. 12 is a flowchart detailing the input handling for operating the locking mechanism in accordance with the present invention.

Turning to the functional diagrams of FIGS. 11 and 12, the enrollment function whereby a main user can add, remove or reset the stored fingerprint data in the processor 18 is shown. The main user initiates the system at step 200 by selecting a mode button from at least those of add, remove or reset. The processor 18 thus recognizes that either addition fingerprints are to be added at step 202; certain fingerprints are to be removed at step 204; or the entire system is to be reset at step 206. After selection of the appropriate mode, the main user is required to input at least one of a fingerprint and a password or code through a respective scanning plate 16 and control pad 20 at step 208, knowing that the system understands the authorized main user. Once the desired mode has been entered in the main user's fingerprint and/or code have been verified by the processor at step 201, the processor moves through one of either step 202; the addition of users, or step 204; the removal of certain users, or step 206 which resets the entire system.

Following for the addition of users or the removal or the reset which of these steps is followed by a verification of either of the addition, the removal or the confirmation of the system reset via steps 208, 210, 212, these functions are confirmed and through step 220 can be returned to the start.

Turning now to the functionality processor and of the data handling functions, as shown in the function diagram of FIG. 12, when data is input from the detecting fingerprint scanning plate 16 of a fingerprint, step 230, the system wake up 202 initiates the processor 18 and the data is interpreted whether or not it is compatible with the fingerprint data previously stored in the memory. After that, if the data is compatible with the data previously stored in the memory, the door 2 is to be unlocked step 236 or else, the process returns to the start via step 238.

On the other hand, in the case where no fingerprint data is input at step 230, if the code is input by the buttons on the LCD control pad 20 at step 240, with wake-up at 242, the code input is interpreted whether or not it is compatible with the code previously input in the memory step 244. Also, when the code is compatible with the number previously input in the memory (i.e., the answer to step is "yes"), the door 2 is to be unlocked at step 246. Otherwise, the process returns to the start at step 238.

Thus, when a person whose fingerprint has previously been input into memory holds the doorknob to open the door 4, and puts his finger on the scanning plate 16 recognizing fingerprint of the detecting scanning plate 16 of a fingerprint, a lamp which is formed in the doorknob cover plate turns on and the door 2 is to be opened.

As an additional feature, in the case that a certain time elapses, the entire process is to be reinstated in order to restrain another's entrance.

In the normal operation mode, a user places their hand on the doorknob handle 1 with their thumb adjacent the fingerprint scan plate 16 which data is read by the processor module 18 and compared to the known data. Where the data finds a matching data to the operator's thumb or fingerprint, the processor module 18 sends a signal to permit operation, i.e., rotation of the handle and unbiasing of the latch mechanism and thus operation of the door 2. In the instance where no comparative data with the operator's finger or thumbprint is determined, the affirmative signal to operate the door handle 1 is not sent and the door 2, in general, will remain in a locked state.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A programmable biometric door locking apparatus comprising:

a door operation device comprising:

a door handle a and a door handle support body defining a rotational axis about which the door handle rotates relative to the support body;

a bolt having a locked and an unlocked state as controlled by a locking mechanism;

an operating rod extending along the rotational axis of the door handle to connect the bolt and the door handle;

an electronic user verification system comprising;

a first input having a non-optical biometric fingerprint scanning surface aligned on an outer surface of the door handle perpendicular and coaxial about the axis of rotation of the door handle or receiving input data from direct contact with a user's fingerprint;

a memory for storing comparison data;

a processor for comparing received input data with the stored comparison data and producing an output instruction to the locking mechanism to place the bolt in the looked or the unlocked state; and a second input positioned on the door handle support body apart from the first input to facilitate the storage of comparison data in the memory.

2. The programmable biometric door locking apparatus as set forth in claim 1 wherein the locking mechanism comprises an electro-mechanical device connected to the processor for urging the bolt into the unlocked state according to input from at least one of the first input and second input.

3. The programmable biometric door locking apparatus as set forth in claim 2 wherein the second user input comprises a visual menu displaying a plurality f modes of operation for the electronic user verification system.

4. The programmable biometric door locking apparatus as set forth in claim 3 wherein the second user input comprises a plurality of navigation keys to assist the user in navigating the visual menu.

* * * * *